United States Patent
Jenkins et al.

(10) Patent No.: US 8,356,578 B2
(45) Date of Patent: Jan. 22, 2013

(54) WASTE ENCAPSULATING ANIMAL LITTER

(76) Inventors: Dennis B. Jenkins, Pleasanton, CA (US); Heather L. Day, San Lorenzo, CA (US)

( * ) Notice: Subject to any disclaimer, the term of this patent is extended or adjusted under 35 U.S.C. 154(b) by 0 days.

(21) Appl. No.: 13/243,716

(22) Filed: Sep. 23, 2011

(65) Prior Publication Data

US 2012/0012064 A1   Jan. 19, 2012

Related U.S. Application Data

(62) Division of application No. 12/136,199, filed on Jun. 10, 2008, now abandoned.

(51) Int. Cl.
*A01K 29/00* (2006.01)
(52) U.S. Cl. .................................................. 119/173
(58) Field of Classification Search .............. 119/171, 119/172, 173
See application file for complete search history.

(56) References Cited

U.S. PATENT DOCUMENTS

| | | | |
|---|---|---|---|
| 2,411,430 A | 11/1946 | Hodson | |
| 3,077,457 A | 2/1963 | Kulka | |
| 3,579,418 A | 5/1971 | Schrenk | |
| 3,741,253 A | 6/1973 | Brax et al. | |
| 3,765,371 A * | 10/1973 | Fisher | 119/171 |
| 3,923,005 A | 12/1975 | Fry et al. | |
| 4,009,253 A | 2/1977 | Schleppnik et al. | |
| 4,101,711 A | 7/1978 | Stillman | |
| 4,187,251 A | 2/1980 | Schleppnik | |
| 4,254,169 A | 3/1981 | Schroeder | |
| 4,275,684 A * | 6/1981 | Kramer et al. | 119/171 |
| 4,284,444 A | 8/1981 | Bernstein et al. | |
| 4,310,512 A | 1/1982 | Schleppnik | |
| 4,315,761 A * | 2/1982 | Larrson et al. | 71/21 |
| 4,351,876 A | 9/1982 | Doi et al. | |
| 4,437,429 A * | 3/1984 | Goldstein et al. | 119/173 |
| 4,612,221 A | 9/1986 | Biel et al. | |
| 4,622,221 A | 11/1986 | Schleppnik | |
| 4,705,707 A | 11/1987 | Winter | |
| 4,716,061 A | 12/1987 | Winter | |
| 4,909,986 A | 3/1990 | Kobayashi et al. | |
| 4,959,207 A | 9/1990 | Ueda et al. | |
| 4,989,727 A | 2/1991 | Gordon | |
| 5,022,553 A | 6/1991 | Pontius | |
| 5,128,199 A | 7/1992 | Iyer et al. | |
| 5,129,735 A | 7/1992 | Neal et al. | |
| 5,174,462 A | 12/1992 | Hames | |
| 5,386,803 A * | 2/1995 | Hughes | 119/173 |
| 5,458,091 A * | 10/1995 | Pattengill et al. | 119/173 |
| 5,507,250 A * | 4/1996 | Reddy et al. | 119/173 |
| 5,534,165 A | 7/1996 | Pilosof et al. | |
| 5,634,431 A * | 6/1997 | Reddy et al. | 119/173 |
| 5,659,933 A | 8/1997 | McWilliams | |
| 5,718,887 A | 2/1998 | Wolf et al. | |
| 5,801,116 A * | 9/1998 | Cottrell et al. | 502/404 |
| 5,860,959 A | 1/1999 | Gent | |
| 6,129,715 A | 10/2000 | Cunningham | |
| 6,129,716 A | 10/2000 | Steer | |
| 6,150,004 A | 11/2000 | Oikawa et al. | |
| 6,258,423 B1 | 7/2001 | Giori | |
| 6,543,385 B2 * | 4/2003 | Raymond et al. | 119/171 |
| 6,745,720 B2 * | 6/2004 | Rasner et al. | 119/172 |
| 2003/0218022 A1 | 11/2003 | Chomik et al. | |
| 2005/0000464 A1 * | 1/2005 | Tsengas et al. | 119/171 |
| 2005/0005869 A1 * | 1/2005 | Fritter et al. | 119/173 |
| 2005/0145186 A1 * | 7/2005 | Fung et al. | 119/171 |
| 2005/0175577 A1 * | 8/2005 | Jenkins et al. | 424/76.1 |
| 2008/0140037 A1 * | 6/2008 | Newman | 604/367 |
| 2009/0308323 A1 * | 12/2009 | Van Nieuwenhuijzen-Van Rooijen et al. | 119/173 |

FOREIGN PATENT DOCUMENTS

| | | |
|---|---|---|
| WO | WO02/051788 A1 | 7/2002 |
| WO | WO03/008920 | 1/2003 |

* cited by examiner

*Primary Examiner* — Kimberly Berona
*Assistant Examiner* — Joshua Huson
(74) *Attorney, Agent, or Firm* — Ann Lee

(57) ABSTRACT

Disclosed herein is a method for encapsulating solid animal waste with animal litter to eliminate the odor that emanates from the waste material. An additional benefit is that encapsulation hides the solid waste from view. The encapsulated waste resembles a urine clump in the litter box. Performance-enhancing actives are incorporated in the litter composition to provide this benefit.

3 Claims, No Drawings

WASTE ENCAPSULATING ANIMAL LITTER

CROSS-REFERENCE TO RELATED APPLICATIONS

This application is a divisional of application Ser. No. 12/136,199 filed on Jun. 10, 2008, which is hereby incorporated by reference in its entirety.

FIELD OF THE INVENTION

A composition of animal litter is presented for containing a waste-activated encapsulating barrier having odor and sanitary benefits.

BACKGROUND OF THE INVENTION

Existing animal litters, particularly feline litters, are partially successful in reducing the malodor of solid waste by the combined actions of 1) desiccating the waste, 2) absorbing odors, and 3) providing odor masking agents. A major improvement to the litter system would be a physical barrier that would help block the odor from emanating from the solid waste, and keep the release of odor to a minimum. In addition, this barrier would help to keep the solid waste in one piece, thereby making the waste easier to scoop out in one unit.

SUMMARY OF THE INVENTION

An aspect of the invention includes a method for controlling the odor that emanates from animal waste. The method comprises contacting an animal litter that contains at least one performance-enhancing active that enables encapsulation of solid animal waste and/or urine clumps with solid animal waste and/or a urine clump. The performance-enhancing active then causes the litter material to substantially encapsulate the solid animal waste and/or urine clump with a shell having a thickness of at least 1 mm. The shell physically blocks the emanation of odor from the waste and/or clump.

Another aspect of the invention includes an animal litter that contains at least one performance-enhancing active that enables encapsulation of solid animal waste and/or urine clumps with the animal litter material. The at least one performance-enhancing active upon contact with moisture creates a shell of animal litter having a thickness of at least 1 mm that substantially encapsulates the waste and/or clump. The shell physically blocks the emanation of odor from the waste and/or clump.

DETAILED DESCRIPTION OF THE INVENTION

Before describing the present invention in detail, it is to be understood that this invention is not limited to particularly exemplified systems or process parameters as such may, of course, vary. It is also to be understood that the terminology used herein is for the purpose of describing particular embodiments of the invention and is not intended to limit the scope of the invention.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to an "odor controlling agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. All numerical values, however, inherently contain certain errors necessarily resulting from the standard deviation found in their respective testing measurements.

The following description includes embodiments presently contemplated for carrying out the present invention. This description is made for the purpose of illustrating the general principles of the present invention and is not meant to limit the inventive concepts claimed herein.

DEFINITIONS

As is generally accepted by those of ordinary skill in the animal litter art, the following terms have the following meanings.

As used herein particle size refers to sieve screen analysis by standard ASTM methodology (ASTM method D6913-04e1).

As used herein, the terms "scoopable" and "clumping litter" refer to a litter that agglomerates upon wetting such that the soiled portion (aka "urine clump") can be removed from the litter box leaving the unsoiled portion available for reuse.

As used herein the term "absorbent material suitable for use as an animal litter" refers to the many liquid-absorbing materials and combinations thereof known to those having ordinary skill in the art. Examples of absorbent materials suitable for use as an animal litter include those materials identified as such in any patent or Published patent application.

Examples of commonly used materials include clays, such as kaolinite and bentonite (e.g., sodium bentonite and calcium bentonite); organic materials such as straw, sawdust, wood, paper, and cellulose; and silica gels. The absorbent particles may range in particle size from about 150 µm to about 5 mm (4-100 mesh) and can represent raw materials or composite particles.

As used herein the term "composite particle" means a particle formed by combining smaller discrete particles of either the same composition or different compositions such that the resulting particle, i.e., the "composite particle", is a particle having structural integrity that is of a particle size bigger than that of its component parts. The composite particles useful for animal litter can range in particle size between about 150 µm and about 5 mm and are typically between about 350 µm and about 3 mm.

As used herein the term "composite blend" refers to a dry mixing of the composite particles of the present invention and one or more additional absorbent litter materials and/or other litter additives or the dry mixing of composite particles having different compositions, and/or combinations thereof.

As used herein the terms "litter additives" or "other materials suitable for use as litter additives" refer to performance-enhancing actives as described herein as well as other additives known to be used in litter compositions by those having ordinary skill in the art.

As used herein the term "performance-enhancing active" refers to a material that when present causes the litter composition to exhibit specific characteristics including but not limited to improved odor control, lower density (lightweighting agents), easier scooping, better particle/active consistency, higher clump strength, lower cost, etc. Illustrative materials for the performance-enhancing active(s) include but are not limited to antimicrobials, odor absorbers, odor inhibitors, binders, fragrances, health indicating materials, nonstick release agents, superabsorbent materials, lightweighting minerals, filler materials and combinations thereof. Performance-enhancing actives may comprise between 0-50% of the litter composition. In some cases where the performance-enhancing active is a particularly strong substance, it may be present in only about 0.001%. Additives that enable an animal litter to encapsulate waste material are performance-enhancing actives.

As used herein the term "reinforcing fiber material(s)" means any solid material having a mean cylindrical shape and a length to diameter aspect ratio greater than one that helps to maintain the structural integrity of litter clumps once formed. The fibers may range in particle size from about 1 nm to about 5 mm.

As used herein the term "activated carbon" means absorbent carbon-based materials, including activated and reactivated carbon-based absorbents. Activated carbon, including the material commonly called activated charcoal, is an amorphous form of carbon characterized by high adsorptivity for many gases, vapors and colloidal solids. Carbon is generally obtained by the destructive distillation of coal, wood, nutshells, animal bones or other carbonaceous materials, including coconuts. The carbon is typically "activated" or reactivated by heating to about 800-900° C., with steam or carbon dioxide, which results in a porous internal structure. The internal surfaces of activated carbon typically average about 10,000 square feet per gram. Surface area in absorptive carbons is typically measured by a test called BET-Nitrogen, and measures the extent of the pore surfaces within the matrix of the activated carbon. BET-Nitrogen is used as a primary indicator of the activity level of the carbon, based on the principle that the greater the surface area, the higher the number of adsorptive sites available. It is believed that carbons having a BET number greater than 500 will provide odor control equivalent to PAC at concentration levels equal to or less than those disclosed herein as effective for PAC.

As used herein the term "filler materials" refer to materials that can be used as the absorbent material, but are generally ineffective at liquid absorption if used alone. Therefore these materials are generally used in combination with other absorbent materials to reduce the cost of the final litter product. Illustrative examples of filler materials include limestone, sand, calcite, dolomite, recycled waste materials, zeolites, and gypsum.

One of the mechanisms of odor emission from a litter box is direct volatilization of organic compounds that originate from the waste material with little opportunity for an odor absorbent or odor neutralizing agent to capture or react with the organic compound. In order to control these types of odors, a sealant agent is needed to essentially lock in the organic vapors until they are either absorbed or neutralized by constituents in the litter or removed from the litter box.

The animal litter of the present invention contains component(s) that create a physical barrier to solid animal waste or urine clumps by substantially encapsulating the solid waste or urine clump. Although the technology can be used for both solid waste and urine clumps, much of the discussion will revolve around solid waste. It is understood, however, that any mechanism discussed in conjunction with encapsulating a solid waste material could also be used to encapsulate a urine clump.

The encapsulation effectively hides the waste material and prevents the odor from emanating from the solid waste, thus keeping the release of odor to a minimum. In addition to hiding the presence of the solid waste and blocking the release of odor therein, the encapsulation keeps the solid waste in one piece making the waste easier to scoop out in one unit. A thickness of at least 2 mm around the waste material is desired with the shell typically in the range of about 1 mm to about 50 mm.

Encapsulation can be achieved by at least three mechanisms: (1) a waste-triggered odor barrier reaction; (2) a moisture-triggered self-activating foam reaction; and (3) a moisture-activated reaction. Encapsulation can also be achieved by combinations of these mechanisms.

It is known that activated carbon provides a significant odor absorption benefit. The present invention uses a different odor strategy that works in synergy with the absorbing mechanism of carbon. Carbon works primarily by absorbing malodors after they have been emitted from the solid or liquid waste, but when solid waste is exposed at the surface due to digging it is able to release odors directly in the air. Because, the average litter box commonly contains exposed solid waste, a benefit of the encapsulation strategy of the present invention is that it works even when the solid waste is re-exposed at the surface because the emission of odor from the solid waste is fundamentally blocked. Thus, the present invention can be incorporated into any litter containing activated carbon such as those disclosed in U.S. Pat. No. 5,860,391, Published US Patent Application No. 20050005869, filed Jul. 11, 2003 and Published US Patent Application No. 20060243212, filed Apr. 29, 2005, which are all hereby incorporated by reference.

Urine clumps also benefit from the technology, in the performance areas of odor and clumping, especially on the exterior of the clump where it is common for granules to break off due to low moisture conditions. Thus, the encapsulation material chosen could also enhance urine clump strength and friability of the clumps, provided it functions at low moisture levels and has a binding effect.

The present invention also blocks microbes that originate from the waste material, thereby imparting additional antimicrobial and sanitary benefits, particularly if combined with a disinfectant to ensure sanitary encapsulation and improved cleanliness.

Disclosed are several encapsulation-generating materials that can be combined with the litter absorbent material and any other litter additives to create an encapsulating barrier around solid waste. As stated, these encapsulation-generating materials could be added to any litter absorbent material including natural organic litters, clay litter or agglomerate litter (absorbent particles formed by an agglomeration process). Encapsulation-generating materials that have the lowest organic vapor permeability and the lowest water of activation are expected to work well.

The encapsulation-generating materials can be added as a separate dry ingredient, attached/adhered to the outside of an absorbent particle, added in an agglomeration process or combinations thereof. One embodiment comprises an encapsulation-generating material being added to the exterior of absorbent particles by, for example, an agglomeration process or a spraying process.

The encapsulation-generating material could be combined with a color changing agent, so a visual indication of the encapsulation effect around the solid waste is created.

Three distinct mechanisms of encapsulation generation are disclosed herein: encapsulation by moisture-activation; encapsulation by a moisture-triggered, self-activated foam; and waste-triggered encapsulation. However, combinations of these mechanisms or the addition of various constituents may lead to enhanced results.

Encapsulation by Moisture-Activation

One way to achieve a physical barrier around the solid waste or urine clump is to have particles in the litter material that already have both a high aspect ratio (meaning they are flat and thin) and the ability to stick to the waste and block the odor emitting therefrom.

Another mechanism is to include sealants such as oils, silicones, and polymers in a water-activated matrix such that the sealants could be released by contact with moisture and migrate to coat the waste immediately.

The material should be able to absorb or be miscible with water and water vapor, but should restrict organic compounds and organic vapors, i.e., a material with high water vapor transport and low to zero organic vapor transport.

The following groups of materials potentially provide encapsulation of waste materials:
  Natural water reactive polymers such as galactomannan or polysaccharide, gums and starches (guar gum, alginate, chitosan, xanthan, carrageenan)),
  Synthetic water reactive polymers such as modified starches, modified cellulose (CMC),
  Proteins such as gelatin, albumin
  Water soluble film-formers and gel-formers such as a polyethylene oxide, polyvinyl pyrrolidone (PVP), polyvinyl alcohol (PVA), polyethylene glycol (PEG), and polyacrylic acid, acrylates or similar,
  Modified polymeric materials such as PEG diacrylate, PEG diol
  Barrier oils (silicone oil, mineral oil, etc), encapsulated in a soluble matrix (such as starch),
  Fluorocarbon polymers, protein, macromers, or other synthetic polymeric macromers
  Fumed Silica, silicone-treated and not treated, to form physical water immiscible barrier
  Room temperature vulcanizing silicone, protected by encapsulation until activated
  Mineral cementing agents (bassanite—plaster of paris, portlandite),
  High aspect ratio minerals to provide physical blocking such as mica or pyrophyllite,
  High Aspect ratio odor blocking plastic film pieces (as disclosed in, e.g., US20030218022 A1, WO2003089230 A1 which are hereby incorporated by reference in their entirety)
  Water soluble papers and film such as rice paper or starch flakes,
  Super absorbing polymers and acrylimides, especially as a fine powder,
  Mixtures of the above materials, and
  Any of the above combined with a crosslinking agent, especially a separate crosslinking agent that reacts when triggered by water.
  Any of the above combined with a bentonite clay or other clays.

All the above-listed materials could be combined with an absorbent material in an agglomeration process to (1) ensure that each particle has an adequate amount of encapsulation-generating material and (2) avoid segregation and/or concentration of encapsulation-generating material. However, careful control over the pre-mixing and agglomerating the constituents is necessary to avoid excess moisture which would prematurely activate the encapsulation-generating material.

As an alternative to agglomeration, one or more constituents could be sprayed onto the exterior of the absorbent litter materials using either an aqueous or non-aqueous adhesive spray. Raw materials, agglomerated materials, composites, and composite blends could be sprayed.

Optionally, an odor permeability agent can be added, such as a polyamine silane, to enhance the odor-blocking capability. Optionally, a crosslinking agent can be added to solidify the initial barrier material.

Due to the low water activity on the surface of the fecal material, not all the materials enumerated above can be fully exploited. Effective materials include polyethylene glycol (hereinafter "PEG") and polyvinyl pyrrolidone (hereinafter referred to as "PVP").

Even at low water levels, the PEG reacted to dissolve and coat the exterior of the fecal bolus with great success. Levels of 1% percent were sufficient to provide significant odor control improvement in sensory testing. The effectiveness of the PEG is dependent on its molecular weight. Basically, the molecular weight of the PEG must be low enough to dissolve easily with little moisture. For this reason, higher molecular weight PEGs are less effective. Ideally, the molecular weight of the PEG is in the range of about 500 to 3000.

The odor barrier and physical coherence of the PEG may be enhanced by adding a PEG crosslinking agent, or a crosslinkable PEG, e.g., Biotin PEG Hydrazide or PEG diacrylate. These agents create chemical bonding which produces a thickening or binding effect in the PEG.

In use, the encapsulation is typically triggered by the animal burying the waste or by the user scooping the litter material over the solid waste. Either the moisture contained in the waste directly contacts the active portions of the litter material or the environment surrounding the waste material becomes humid and activates nearby active portions of the litter material to create a shell around the waste.

Examples

The compounds listed in Table 1A were added to a commercial bentonite-based litter. Actives were tested by either coating or covering an approximate 10 gram feline fecal sample for 24 hours, then re-exposing to the surface and evaluating for odor after approximately 4 days. Odor was evaluated using 8 oz. plastic jars. The visual appearance values were determined by burying two small (2-3") boli overnight in 200 g of litter in a 6" weighing boat. The litter was scooped to remove the boli and examine the level of encapsulation or coating. Coating values were assigned ranging from 0-10 based on the following criteria: a 0 equals about 20% coverage; a 5 equals about 100% coverage, but only a single layer coating; and a 10 equals about 100% thick coverage, having no gaps (basically the waste looked like urine clump).

The compounds listed in Table 1B were added to a bentonite-based litter. Additionally about 15% of the bentonite-based litter was crushed to 20×80 mesh. Having finer particles present aided with encapsulation. Actives were tested by either coating or covering an approximate 10 gram feline fecal sample for 24 hours, then re-exposing to the surface and evaluating for odor after approximately 4 days. Odor was evaluated using 8 oz. plastic jars. The visual appearance values were determined by burying two small (2-3") boli overnight in 200 g of litter in a 6" weighing boat. The litter was scooped to remove the boli and examine the level of encapsulation or coating. Coating values were assigned ranging from 0-10 based on the following criteria: a 0 equals about 20% coverage; a 5 equals about 100% coverage, but only a single layer coating; and a 10 equals about 100% thick coverage, having no gaps (basically the waste looked like urine clump).

TABLE 1A

| Actives | Odor Results | Clay Coating Result |
|---|---|---|
| Control (bentonite litter) | Detectable odor | 0 |
| 15% 35 × 100 bentonite | Detectable odor | 1 |
| 3% Bentonite Powder | Detectable odor | 2 |
| 1% Modified Starch No. 3 1% Bentonite Powder | Detectable odor | 2 |
| 3% Maltodextrin | Slightly Detectable odor | 6 |
| 3% Alginate Instant Formula | Slightly Detectable odor | 7 |
| 3% Modified Starch No. 3 1.5% PVP 15% 35 × 100 bentonite | Slightly Detectable odor No Detectable odor | 9 10 |
| 1% PVP 1% Bentonite Powder | No Detectable odor | 10 |

TABLE 1B

| Actives | Particle Size Adjustment | Odor Results | Clay Coating Result |
|---|---|---|---|
| 1.5% PVP 15 and 1.5% Miragel 463 | 15% 20 × 80 mesh bentonite-based litter | No odor | 10 |
| 1.5% PVP 15 and 1.5% Na Alginate Shaker Gel | 15% 20 × 80 mesh bentonite-based litter | No odor | 10 |
| 1.5% PVP 15 and 1.5% ET Encap Starch | 15% 20 × 80 mesh bentonite-based litter | No odor | 10+++ |
| 1.5% PVP 15 and 3% Rice Flakes | 15% 20 × 80 mesh bentonite-based litter | No odor | 10 |
| 1.5% PVP 15 and 1.5% Albumin (Just Whites) | 15% 20 × 80 mesh bentonite-based litter | No odor | 10 |
| 1.5% PVP 15 and 3% Encap Starch | 15% 20 × 80 mesh bentonite-based litter | Slight odor | 9 |
| 1.5% PVP 15 and 1.5% Guar Gum Intimately Mixed | 15% 20 × 80 mesh bentonite-based litter | No odor | 10+ |

Different molecular weights of PEG were evaluated by covering an approximate 10 gram feline fecal sample for 24 hours, then re-exposing to the surface and evaluating for odor after approximately 24 hours. The results are summarized in Table 2 below. PEG can be used alone, or as a carrier for another encapsulation-generating material.

TABLE 2

| Sample | Malodor |
|---|---|
| 1 g PEG 1450 (Carbowax) + 50 g bentonite clay dry mixed | low |
| 1 g PEG 8000 (Carbowax) + 50 g bentonite clay dry mixed | medium |
| 1 g PEG 1950 + 8 g IPA + 2 g $H_2O$ | medium |

Low molecular weight polymers are more effective than high molecular weight polymers because they have greater reactivity to low levels of moisture and greater hydrophilicity. Also, polymers with greater hydroxyl functional groups generally work better, since they have greater hydrophilicity.

The performance of dry blended and sprayed on applications of PEG to bentonite clay were tested. The samples were tested by placing directly on the surface of a feline fecal sample. The results and observations are listed in Table 3.

TABLE 3

| Sample | Observations |
|---|---|
| 250 g of bentonite + 5 g (2%) PEG 1450 was sprayed in tumbler with 4 g of a 25% Rho . . . -619 solution to adhere PEG particles | PEG particles melted coating surface and bentonite particles were stuck more firmly to the surface |
| 100 g bentonite + 12 g of (10 g PEG 1450 and 4 g $H_2O$) sprayed on the bentonite | Acted similarly to bentonite clumping litter with no swelling or change in shape. Easy to remove after drying |

Encapsulation by a non-foaming (i.e., non-effervescing) acid base reaction can also propagate effective encapsulation. As those familiar with the art know, the generation of water is a side reaction of any acid base reaction. However, it has been surprisingly observed that in some cases this water generation is sufficient to create enough moisture to result in an effective encapsulation even when the surface and/or environment surrounding the surface of the waste material is very dry.

Some advantages to using a foaming acid/base reaction for encapsulation are: (1) space-filling volume is created which helps fill the clay particle voids, making better bonds; (2) a dry network of foam cell walls enhances dry strength and avoids the "hollow shell" effect; (3) the acid/base reaction creates water, which is critical for creating good bonding and foam formation in moisture-poor environments (such as solid waste), and (4) a foam shell contains numerous independent air pockets, resulting in a very good barrier for odor.

"Hollow shell" effect as used herein refers to the creation of a shell around the waste material that has an air gap between the outer surface of the waste material and the inner surface of the shell, due to the shrinkage of the waste upon drying. Ideally, the shell should be relatively solid with a thickness of at least about 2 mm between the exterior surface of the waste material and the inner surface of the shell.

Encapsulation by Moisture-Triggered Self-Activated Foam

An odor barrier can be formed by creating a waste-activated foam that surrounds and encapsulates the solid waste, physically tying the solid waste together to make it easier to remove in one unit. Disclosed are several systems which can create a waste-activated foam encapsulation. These materials could be added to natural organic litters, clay litter or to agglomerate litter. Systems which react with low moisture, have low organic odor permeability and create a void-filling foam are preferred.

Generally, each system will have at least one performance-enhancing active. Typically present are a gas generating agent, a waste-reactive or moisture-reactive initiator, and a foam builder, but it is possible for an effective system to only have a gas generating agent and a waste-reactive or moisture-reactive initiator. In some cases a single constituent may be dual functioning. Optionally, a vapor barrier agent can be included as well.

For the gas generating agent, an example of a simple $CO_2$ generator is sodium bicarbonate, but potassium bicarbonate, calcium carbonate, magnesium carbonate and other carbonates or percarbonates, such as sodium percarbonate ($2Na_2CO_3 \cdot 3H_2O$) could be used. Limestone which primarily comprises calcium carbonate can also be used as the $CO_2$ generator. Isocyanate systems are possible, but less preferred due to environmental, health and safety concerns.

Effective initiators are soluble acids, such as citric acid, malic acid, fumaric acid, boric acid or similar solid acids which react with carbonate and release $CO_2$.

Desirable features of the foam builder include a combination of wet foam (or bubble) stability and dry structure.

For wet foam stability, surfactants that lower surface tension such as Neodol, sodium dodecyl sulfate, APG (Alkylpolyglucoside), fatty alcohols (lauryl alcohol), alkanol amides, amine oxides, sodium alginate, PVA (polyvinyl alcohol) are desirable. Finely divided particles such as silica and bentonite powder can stabilize foams. Modified starches generally contain some form of surfactant and thus, provide both a binding and a stability function.

For structure when dry, natural and synthetic film forming polymers such as alginate, PVA, gums, natural and modified starch, acrylates, PVP, and as well as most of the encapsulation materials mentioned in paragraph [0037] above. Of particular interest are high amylose starches like those used in packaging foam and certain modified starches which are combinations of starch, dextrin and surfactant(s). The addition of crosslinking agents supports the physical coherency of any of these polymers, including PEG crosslinking components. If the primary absorbent material is a clay, it too will contribute to the structure of the foam.

The combination of incorporating a gas-generating reaction and a film forming polymer (or binder material, e.g., a modified starch) into the litter composition led to unexpected synergistic results. Surprisingly, modified starches with good hydrophilicity were observed to work significantly better than most other binders.

The film-forming binder PVP also worked well. PVP exhibited high sensitivity to humidity and resulted in encapsulating reactions at levels ranging from about 0.5 to about 15 weight percent. Incorporation of a pH-dependent soluble polymer into the litter may avoid polymer caking in humid environments, yet still enable the polymer to respond to the pH of the solid waste.

Optionally a separate organic vapor barrier agent may be added such as a polyamine silane, PVP, or PEG. The vapor barrier agent aids in odor control.

Activated carbon or charcoal could be added to absorb odors that are trapped by the encapsulation.

Sample formulas include:

Citric acid, sodium bicarbonate and a modified starch. The bicarbonate is the source of gas and reacts with the citric acid when moisture is available.

Citric acid and limestone, bentonite and water soluble starch. The bicarbonate is the source of gas and reacts with the citric acid when moisture is available. The starch acts as a natural polymer binder to enhance the barrier.

Citric acid and sodium bicarbonate, bentonite and a polymer such as guar gum. The bicarbonate is the source of gas and reacts with the citric acid when intimately mixed. The guar gum acts as a binder to enhance the barrier.

Boric acid, baking soda or limestone, clay, Neodal® (a surfactant), a modified starch.

Citric acid, baking soda or limestone, clay, Neodal®, guar gum.

Clay, baking soda or limestone, sodium lauryl (a surfactant) sulfate, modified starch, activated charcoal.

A variety of polymers chosen from a range of acrylates, acrylimides, PVAs, vinyls, etc. could be added as a binder to enhance the physical structure of the barrier.

As the environment in the litter box can become somewhat humid, it important to consider the effect of humidity on the stability of the varying litter constituents. Premature reaction is one consequence of employing humidity sensitive ingredients, so care should be taken to minimize the effect of a humid environment.

A formula containing baking soda and citric acid is sensitive to humidity and therefore some form of protection from humidity may be required to keep the constituents from reacting prematurely. Some protecting agents include materials such as mineral oil and maltodextrin. Solid encapsulation of the solid bicarbonate and citric acid is also an option. Also, an anti-caking agent may be employed such as fumed silica.

It was observed that the combination of calcium carbonate and citric acid provided a good encapsulating reaction on the fecal surface without being too sensitive to humidity. The addition of enzymes, such as a protease and disulfide bond disrupters (such as calcium thioglycolate) can help breakdown the feces and enhance the encapsulating reaction.

For example, much of the animal litter used for household pets is purchased for cats. Cat feces contain high amounts of hair/fur and therefore, the inventors have found that adding depilatories (hair removal chemicals) to the litter composition of the present invention to dissolve the hair/fur aids encapsulation. Depilatories include disulfide bond disrupter, such as calcium thioglycolate.

Encapsulation by Waste-Triggered Reactions

A third mechanism of encapsulation comprises barrier or foaming reactions that don't rely on the moisture content of the waste, but on the chemical composition acting as a trigger or catalyst. For example, bilirubin, common in solid waste will react with diazotized sulfonic acid to produce azobilirubin.

Alternatively, the high content of amines and other nitrogen compounds found in feline solid waste can provide a direct reaction with a barrier compound present in the litter.

Properties of Materials

Several additional constituents are contemplated as creating even greater synergy with the encapsulation reaction mechanisms discussed. For example, enzymes (such as proteases), disulfide bond disrupters (such as calcium thioglycolate), and denaturants (such as urea) could be used to increase/enhance waste breakdown; minerals (such as mica) and starches (such as rice flakes) could be used to create/enhance physical blockage; proteins (such as albumin, whey protein, soy protein, gelatin), gums (such as guar), and polymers (such as PVP and guar) could be used to create/enhance the binding and adhesion of the absorbent material (such as clay) to the fecal surface; moisture activated sealants (such as PEF, PVP, sugar) could be used to create a seal or coating around the waste; crosslinkers (such as homobifunctional crosslinkers) could be used for in situ polymerization of fecal protein; and a moisture activated foam (such as BS/Gypsum with sodium docecylsulfate and a builder) could be used to create/enhance foaming.

Examples

Encapsulation by Moisture-Activation

Polyethylene Glycol (PEG) was added as a dry addition to a regular bentonite-based clumping clay litter and tested using real cat waste. PEG has shown the ability to achieve an odor reduction through an odor barrier encapsulation. Results are shown below as average score using trained panelists.

Malodor scores are on a scale of 0-60 with 60 being worst and 0 being best. A blank booth with no waste at all usually gives a panelist score of about 10.

TABLE 4

| Litter Material | Malodor Score |
|---|---|
| Bentonite clay (Control) | 27.5 |
| Bentonite clay with 1% PEG 3350 (med mol wt) | 22.7 |
| Bentonite clay with 2% PEG 1450 (low mol wt) | 19.9 |
| Bentonite clay with 1% PEG 1450 (low mol wt) | 18.3 |

The quality of the encapsulation was tested by burying two small 2-3" boli overnight in 200 grams of a bentonite-based clumping litter using about a 6" weighing boat. At the end of three days the litter was scooped to remove the boli and examiner the level of encapsulation.

TABLE 5

| Performance-enhancing Active | Result |
|---|---|
| 1.5% PVP 1.5% powdered sugar | 100% coverage; about 50% coverage, some gaps in coating |
| 1.5% PVP 1.5% bentonite fines | Great-100% thick coverage; no gaps, looked like urine clump, blocked odor |
| 1.5% PVP 1.5% bakers sugar | 100% coverage; about 50% coverage, some gaps in coating |
| 1.5% PVP 1.5% maltodextrin | Great-100% thick coverage; no gaps, looked like urine clump, blocked odor |
| 3% maltodextrose | 100% coverage, but thin single layer coating |
| 15% PVP-treated limestone (limestone coated with 2% PVP) | No appreciable coverage |

The quality of the encapsulation was tested by buying two small 2-3" boli overnight in 200 grams of a bentonite-based clumping litter using about a 6" weighing boat. At the end of three days the litter is scooped to remove the boli and examiner the level of encapsulation. Starch samples are modified starches obtained from Alco Chemical. They contain various amounts of starch, dextrins and surfactants. Guar gum samples represent various compositions of guar gums.

TABLE 6

| Performance-enhancing Active | Result |
|---|---|
| Bentonite control sample (no active added) | No appreciable coverage |
| 3% PVP control | Great-100% thick coverage; no gaps, looked like urine clump, blocked odor |
| 3% PVP with Rhoplex ® binder | Great-About 90% thick coverage; almost no gaps, looked a lot like urine clump blocked most odor |
| Starch Sample No. 1 | About 85% coverage, but single layer coating |
| Starch Sample No. 2 | About 85% coverage, but single layer coating |
| Starch Sample No. 3 | Great-About 90% thick coverage; almost no gaps, looked a lot like urine clump, blocked most odor |
| Starch Sample No. 4 | Only slightly better than control |
| Starch Sample No. 5 | No appreciable coverage |
| Starch Sample No. 6 | Great-About 80% thick coverage; almost no gaps, looked a lot like urine clump, blocked most odor |
| Starch Sample No. 7 | Only slightly better than control |
| Starch Sample No. 8 | Only slightly better than control |

TABLE 6-continued

| Performance-enhancing Active | Result |
|---|---|
| 1% PVP 1% maltodextrin 1% powdered bentonite | Great-100% thick coverage; no gaps, looked like urine clump, blocked odor |
| 3% maltodextrin | 100% coverage, but thin single layer coating |
| 15% 35 × 100 mesh bentonite | No appreciable coverage |
| 3% bentonite powder | Slightly better than control |
| 1% Starch Sample No. 3 1% bentonite powder | Slightly better than control |
| 3% alginate instant formula | 100% thin layer coverage; about 50% thick coverage, some gaps in coating |
| 3% Starch Sample No. 3 | Great-About 90% thick coverage; almost no gaps, looked a lot like urine clump, blocked odor |
| 1.5% PVP 15% bentonite powder | Great-100% thick coverage; no gaps, looked like urine clump, blocked odor |
| 1% PVP 1% bentonite powder | Great-100% thick coverage; no gaps, looked like urine clump, blocked odor |
| 1% Guar Gum Sample No. 1 | About 75% coverage, but single layer coating |
| 1% Guar Gum Sample No. 2 | About 75% coverage, but single layer coating |
| 1% Guar Gum Sample No. 3 | About 75% coverage, but single layer coating |
| 3% Guar Gum Sample No. 1 | About 75% coverage, but single layer coating |
| 3% Guar Gum Sample No. 2 | About 85% coverage, but single layer coating |
| 3% Guar Gum Sample No. 3 | About 75% coverage, but single layer coating |

Encapsulation by Moisture-Triggered Self-Activated Foam:

A feasible component for waste encapsulation is the starch used for bio-degradable packaging materials, e.g., high amylose starch. For example, National Starch sells this as ECO-foam or ECO-MAIZE, or ECO-PLUS. Dissolving already made packaging pellets into a starch solution and adding baking soda and citric acid (via Alka Seltzer® tablet) creates an expanding foam which keeps it's shape. This mixture was placed on real cat waste and completely blocked the odor from emanating as long as the surface was covered with the foam.

A mixture of starch (foam grade, high amylase), baking soda and citric acid, can be activated by the moisture in the solid cat waste to create foam. The mixture could even be made as a foam or clay/foam to increase coverage and lighten the product.

Alternatively, a mixture of bentonite clay, starch (foam grade), baking soda and citric acid was also used and created a foam barrier around a bolus.

Additives were placed on a homogenized fecal surface and observed under a microscope. The observations are shown in Table 7 below.

TABLE 7

| Additive | Reaction | Potential for barrier encapsulation |
|---|---|---|
| plain bentonite particles | lightly stuck; no absorption or swelling; easily comes off; appear that there is not enough water from the fecal sample | Poor |
| super absorbent polymer JB2024 | slight absorption; but not enough to swell for most particles | Poor |

TABLE 7-continued

| Additive | Reaction | Potential for barrier encapsulation |
|---|---|---|
| citric acid | quickly dissolved to liquid | Good |
| baking soda/ citric acid (Alka Seltzer) | Immediate and continuing reaction | Great |

Several self-generating foam trials were prepared and tested. The following formulas were prepared: 4.18 g 3350 PEG, 0.58 g Alka Seltzer® and 0.1 g sodium sulfate; 3.62 g 1450 PEG, 1.84 g Alka Seltzer® and 0.2 g sodium sulfate; and 2.67 g 1450 PEG, 1.52 g Alka Seltzer® and 0.2 g sodium sulfate. All were successful at generating bubbles and foam without clay, but foam was not permanent. Adding foam stabilizer and/or polymer(s) for enhancing stiffness will increase foam stability and longevity.

The ability of a surfactant component to generate a long-lasting foam was tested. Each of the solutions listed in Table 8 below were tested by blowing a stream of air into the solution in a 1-2" weighing boat to generate bubbles and enough foam to fill a 1-2" weighing boat.

TABLE 8

| Sample | Result |
|---|---|
| 0.08 g sodium dodecyl-sulfumate (SDS) + 10 drops de-ionized water | forms bubbles, but they quickly break; foam lasts no longer than 30 seconds |
| 0.06 SDA + 0.07 APG + 15 drops de-ionized water | forms bubbles; break somewhat quickly; improved from SDS alone; foam lasts no longer than about 1 minute |
| 0.12 APG + 15 drops de-ionized water | forms bubbles; last longer; foam lasts about 2 minutes |

Encapsulation by Moisture-Triggered Self-Activated Foam including a Binder:

The quality of the encapsulation was tested by a qualitative coating test. Two small (2-3") boli were buried overnight in 200 g of a bentonite-based clumping litter containing "foaming" actives in a 6" weigh boat. The litter was scooped to remove the boli and the level of encapsulation/coating was examined. Results are shown in Table 9 below. Percentages of active are in weight percent with the balance being a bentonite-based clumping litter.

TABLE 9

| Performance-enhancing Active | Result |
|---|---|
| 1.5% modified starch 2.5% baking soda 2.5% Citric Acid | Good encapsulation with a strong bond |
| 1.5% modified starch 5.0% baking soda 5.0% Citric Acid | Good encapsulation with a strong bond |
| 1.5% modified starch 7.5% baking soda 7.5% Citric Acid | Good encapsulation with a strong bond Tendency to cake |
| 1.0% modified starch 2.5% baking soda 2.5% Citric Acid | Good encapsulation with a strong bond |
| 1.0% modified starch 5.0% baking soda 5.0% Citric Acid | Good encapsulation with a strong bond |
| 1.0% modified starch 7.5% baking soda 7.5% Citric Acid | Good encapsulation with a strong bond Some tendency to cake |
| 0.5% modified starch 2.5% baking soda 2.5% Citric Acid | Good encapsulation with a strong bond |
| 0.5% modified starch 5.0% baking soda 5.0% Citric Acid | Good encapsulation with a strong bond |
| 0.5% modified starch 7.5% baking soda 7.5% Citric Acid | Good encapsulation with a strong bond Tendency to cake |

The quality of the encapsulation was tested by a qualitative coating test. Two small (2-3") boli were buried overnight in 200 g of a bentonite-based clumping litter containing "foaming" actives in a 6" weigh boat. The litter was scooped to remove the boli and the level of encapsulation/coating was examined. Results are shown in Table 10 below. Percentages of active are in weight percent with the balance being a bentonite-based clumping litter. The modified starch was a combination of starch, dextrins and surfactants from Alco Chemical; the baking soda was "coarse granular"; and the citric acid was "Anhydrous Fine" from Tate & Lyle.

Coating values were assigned ranging from 0-10 based on the following criteria: a 0 equals about 20% coverage; a 5 equals about 100% coverage, but only a single layer coating; and a 10 equals about 100% thick coverage, having no gaps (basically the waste looked like urine clump) but it was fragile and tended to fracture when scooped; 15 equals the same appearance as 10, but stronger (could be handled without fracturing, but not as strong as a typical urine clump); and 20 equals the same appearance as 10, but as strong as a urine clump.

TABLE 10

| Formula | Result |
|---|---|
| 1% modified starch 20% baking soda 10% Citric Acid | 20 |
| 1% modified starch 10% baking soda 5% Citric Acid | 18 |
| 1% modified starch 20% baking soda 10% Citric Acid | 20 |
| 1% modified starch 10% baking soda 5% Citric Acid | 10 |

In order to reduce the tendency to cake, limestone was tested in place of baking soda. Additionally, limestone also offers a cost advantage over baking soda.

The quality of the encapsulation was tested by a qualitative coating test. Two small (2-3") boli were buried overnight in 200 g of a bentonite-based clumping litter containing "foaming" actives in a 6" weigh boat. The litter was scooped to remove the boli and the level of encapsulation/coating was examined. Results are shown in Table 11 below. Percentages of active are in weight percent with the balance being a bentonite-based clumping litter. The modified starch was a combination of starch, dextrins and surfactants from Alco Chemical and the citric acid was "Anhydrous Fine" from Tate & Lyle.

Coating values were assigned ranging from 0-10 based on the following criteria: a 0 equals about 20% coverage; a 5 equals about 100% coverage, but only a single layer coating; and a 10 equals about 100% thick coverage, having no gaps (basically the waste looked like urine clump) but it was fragile and tended to fracture when scooped; 15 equals the same appearance as 10, but stronger (could be handled without fracturing, but not as strong as a typical urine clump); and 20 equals the same appearance as 10, but as strong as a urine clump.

TABLE 11

| Formula | Result |
| --- | --- |
| 0.5% modified starch 10% limestone 1% Citric Acid | 1 |
| 2% modified starch 10% limestone 1% Citric Acid | 5 |
| 0.5% modified starch 10% limestone 5% Citric Acid | 11 |
| 2% modified starch 10% limestone 5% Citric Acid | 10 |
| 0.5% modified starch 30% limestone 1% Citric Acid | 1 |
| 2% modified starch 30% limestone 1% Citric Acid | 5 |
| 0.5% modified starch 30% limestone 5% Citric Acid | 10 |
| 2% modified starch 30% limestone 5% Citric Acid | 15 |

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

We claim:

1. A method for controlling the odor that emanates from animal waste comprising:
providing an animal litter comprising (1) an absorbent material suitable for use as an animal litter, (2) a hydrophilic modified starch, (3) a water soluble acidic solid material, and (4) a carbonate-containing or percarbonate-containing solid material wherein said animal litter enables encapsulation of solid animal waste and/or urine clumps;
contacting the animal litter with a moisture containing solid animal waste and/or urine clump;
dissolving the acidic solid material with moisture contained in the solid animal waste and/or urine clump to initiate a gas-generating reaction;
creating a foam from the gas-generating reaction between the acidic solid material and the carbonate-containing or percarbonate-containing solid;
perpetuating the gas-generating reaction by creating water from the reaction between the solid acid and the carbonate-containing or percarbonate-containing solid material;
covering said solid animal waste;
substantially encapsulating the solid animal waste and/or urine clump with the foam produced by the gas-generating reaction;
using the hydrophilic modified starch to create a structural network within the foam to give the foam longevity and shape to provide structural integrity to the foam shape as the foam dries;
allowing the foam to dry; and
creating a dry foam that substantially encapsulates the solid animal waste and/or urine clump with a shell of animal litter to physically block the emanation of odor from the solid animal waste and/or urine clump.

2. The method recited in claim 1, wherein the hydrophilic modified starch contains starch, dextrins and surfactants.

3. The method recited in claim 2, wherein the surfactants create the structural network within the foam to give the foam longevity and shape and the starch and dextrins provide structural integrity to the foam shape as the foam dries.

* * * * *